United States Patent [19]
Kammerer et al.

[11] 3,985,190
[45] Oct. 12, 1976

[54] DAMPING OR ATTENUATION DEVICE FOR THE STOPPING OR ARRESTING ARRANGEMENT OF A SCALE

[75] Inventors: Manfred Kammerer; Johann Tikart, both of Ebingen, Germany

[73] Assignee: August Sauter GmbH, Ebingen, Germany

[22] Filed: July 10, 1975

[21] Appl. No.: 594,854

[30] Foreign Application Priority Data
July 17, 1974 Germany............................ 2434289

[52] U.S. Cl................................ 177/184; 177/154; 188/288
[51] Int. Cl.²...................................... G01G 23/08
[58] Field of Search .......... 177/184, 187, 188, 189, 177/154, 155, 156, 157, 158; 188/288, 316

[56] References Cited
UNITED STATES PATENTS

| | | | |
|---|---|---|---|
| 1,584,884 | 5/1926 | Merrick | 188/288 |
| 3,062,331 | 11/1962 | Wyman | 188/288 |
| 3,876,017 | 4/1975 | Ziefle | 177/157 |

*Primary Examiner*—Joseph W. Hartary
*Attorney, Agent, or Firm*—Ernest F. Marmorek

[57] ABSTRACT

The damping arrangement includes a cylinder with various diameters in order to first attain a slow movement of the piston through the restricted position and to cause it to move faster through the enlarged portion. Such movement controls the lowering speed of the platform onto the knife edges and the slower movement is present until the platform comes into contact with the knife edges thereby preventing a damage of the knife edges.

3 Claims, 5 Drawing Figures

DAMPING OR ATTENUATION DEVICE FOR THE STOPPING OR ARRESTING ARRANGEMENT OF A SCALE

FIELD OF THE INVENTION

The present invention relates to a damping arrangement for the stopping apparatus of a scale.

BACKGROUND OF THE INVENTION

The above type arrangements are provided in fine scales in which the stopping and releasing steps occur frequently and fast or are repeated, in order to protect the very sensitive knife edges when the load is dropped on the pan or platform. It has been customary in order to protect the knife edges to remove the scale beam from its support in order to affect its locking or stopping and thereby the load or end and the middle or main knife edges become unloaded. For weighing, that is when the releasing is performed, the middle edge is lowered on its support and the end edge support is lowered onto the end edge.

If such lowering was taking place too fast, then the knife edges could become damaged leading to inaccuracy in later weighings.

In order to prevent the above, motorized lowering arrangement came into being which provided a constant lowering speed, independent of the operator, for the knife edges and the platform. Such arrangements required a large and complex apparatus, therefore, they are expensive and do not reliably prevent a hard lowering of the knife edges and the platform onto each other, especially during variation in the power supply.

For the controlling of the lowering speed also pneumatic dampers become known. Such dampers have the disadvantage that they require the compression of the air and sometimes the damping is so weak that transmission levers are required for the amplification of the damping.

SUMMARY OF THE INVENTION

It is an object of the present invention to provide a damping arrangement free from the above-noted disadvantages of known arrangements and in which the lowering speed can be additionally controlled.

BRIEF DESCRIPTION OF THE DRAWINGS

The invention will become more readily apparent from the following description of the preferred embodiments thereof shown in the accompanying drawings, in which.

DESCRIPTION OF THE PREFERRED EMBODIMENTS

Figure 1:
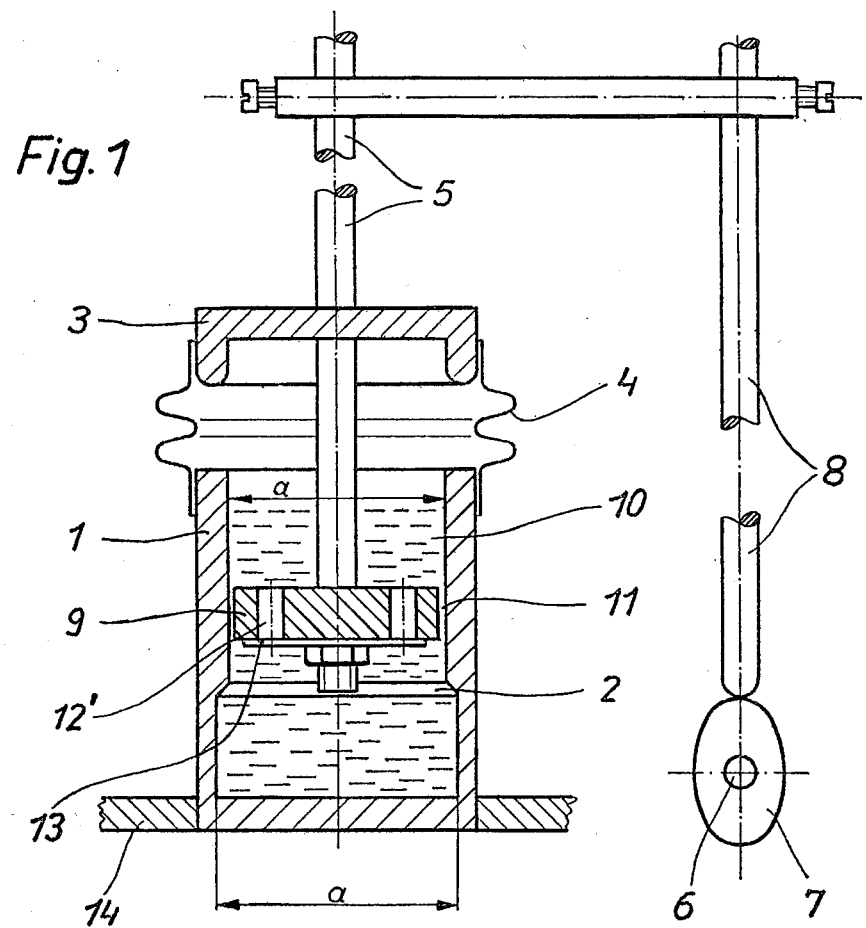
FIG. 1 is a vertical section through the damping arrangement according to the invention.

With reference to FIG. 1 it is seen that the hydraulic cylinder 1 has in its lower portion a diameter $a$ which is larger than the similar diameter in its upper portion. At the transient region from the normal to the larger internal diameter $a$ there is a bevel 2 arranged. Between the hydraulic cylinder 1 and a cover means 3 which closes its upper end there is a flexible bellows 4 arranged which joins the hydraulic cylinder 1 with the cover means 3 airtight. The cover means 3 is fixedly connected with the piston rod 5 which goes to the stopping arrangement. The cover means 3 can be left out in the event the flexible bellows 4 is closed on the top and it is arranged to airtightly surround the piston rod 5. The damping arrangement is illustrated here in the "stopped" or arrested state of the scale. When the releasing takes place, that is, when the knife edges and the platform are lowered onto each other for the weighing process and, they are in operating contact, then the switching axel 6 becomes operated on. A cam 7 is turned and the stopping axel 8 moves downward. Simultaneously the piston rod 5 together with the piston 9 will perform a downward movement as effected by the weight of the stopping arrangement. As a result the damping fluid 10 is in the hydraulic cylinder 1 will escape upward through the narrow annular space 11. Due to the very high resistance which effects the piston 9 as a result, the moving and the bringing of the knife edge and the platform into contact will undergo very slowly and thereby gently. The displacement of the piston 9 is designed in such a manner that when the knife edges and the platform have been gently brought into contact, the piston 9 will be quickly moved further downward to its end position, which is the weighing position of the scale.

The latter is accomplished through the increase in the diameter of the hydraulic cylinder 1 with respect to its inner diameter $a$. When the piston 9 passes the bevel region 2, the annular space 11 increases considerably and the resistance to which the piston is encountering becomes much smaller as more damping fluid can escape upward.

Figure 2:
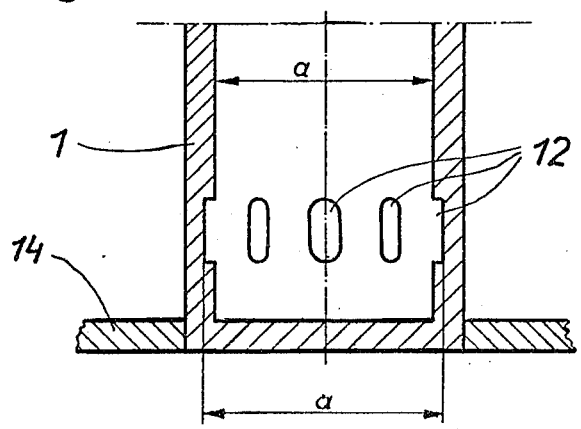
FIGS. 2–4 are various embodiments for the hydraulic cylinder constructed according to the present invention.
Figure 3:
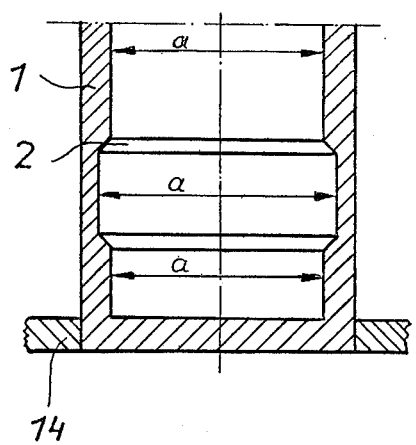
Figure 4:
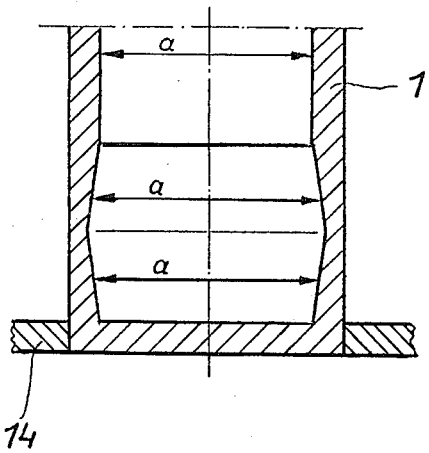

FIGS. 2–4 illustrate other possible embodiments, especially how the speed of the downward movement of the piston 9 can be effected by increasing and again reducing the inner diameter $a$ of the hydraulic cylinder 1 in its lower portion. This can be done, for example, by providing recesses 12, as in FIG. 2, or having various cylinder diameters as in FIG. 3, or oppositely directed conicity of the cylinder as in FIG. 4. In the last example the speed of the piston 9 would first continuously increase then again decrease.

To stop the scale, the switching axel 6 is operated on, then the stopping cam 7 moves the stopping axel 8 upwardly. Simultaneously the piston 9 together with the piston rod 5 move upward. This upward movement occurs very quickly inasmuch as the piston 9 at the beginning of such movement is located in the region of the enlarged internal diameter $a$ and, it is also provided with the apertures 12' which during the downward movement are closed by the membrane 13, however, at the upward movement of the piston they are opened, whereupon the resistance to which the piston is exposed becomes reduced.

Figure 5:
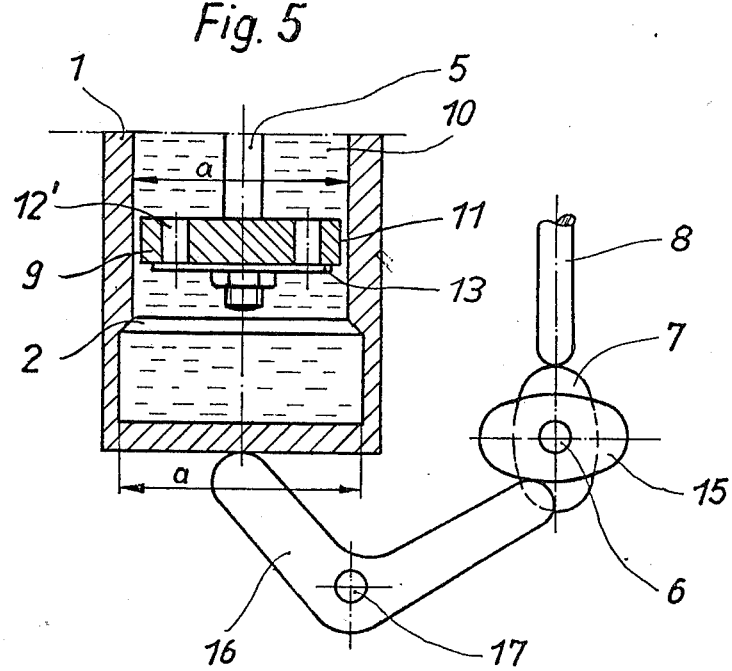
FIG. 5 is a further embodiment of the damping arrangement according to the present invention.

FIG. 5 illustrates a further preferred embodiment in which the hydraulic cylinder 1 is not fixedly connected to the scale housing 14, but is arranged for vertical movement. In addition to the process of operation described in connection with FIG. 1, during the releasing phase, here the hydraulic cylinder 1 when the switching axel 6 is operated on becomes lifted upward by a lever 16 that is journalled about a pivot 17 and which lever 16 is operated on by a cam 15 operatively connected with the axel 6. Such upward movement of the hydraulic cylinder 1 occurs against the piston 9. As a result the damping effect will be increased. In this embodiment the stopping cam 7 carried by the switching axel 6 and the cam 15 are dimensioned for cooperation in such a manner that the upward movement of the hydraulic cylinder 1 is commenced before the downward movement of the piston rod 5 together with the piston 9 would start, whereupon an increased damping affect is obtained at the downward movement of the piston rod 5.

The scale itself together with the stopping arrangement and the supporting of the vertically moving hydraulic cylinder 1 is not illustrated as those parts are well-known and would only unnecessarily crowd the drawings illustrating the features of the invention.

The hydraulic cylinder 1 is only partially filled with damping fluid so that above it there is an air space left and which deforms the flexible bellows 4 in such a manner that the volume of the air remains always constant and thereby there is no resetting force present which would be due to the compensation of the air. This alone is an important advantage of the present invention.

Furthermore it is advantageous that the releasing and the positioning of the scale into weighing position occurs quickly and with an optimum safety for the very sensitive knife edges of the scale.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A damping device for use in connection with the arresting arrangement of a scale apparatus,
    comprising in combination
    a hydraulic cylinder having a lower portion and an upper portion, the diameter of said lower portion being different in size from the diameters of said upper portion,
    a piston including a rod operatively arranged in said cylinder,
    cover means for said upper portion of said cylinder operable for tightly sealing said cylinder,
    means adapted for coupling said piston rod with said arresting arrangement,
    said piston being arranged with a clearance in said cylinder for allowing hydraulic fluid to pass around said piston,
    wherein said cover means includes a flexible bellows and a cover plate,
    said bellows being fixedly connected between said cylinder and said cover plate,
    said piston rod being fixedly coupled to said cover plate,
    said coupling means including a connecting rod substantially parallel with said piston rod,
    cam means operatively coupled with said connecting rod, and a switching axel fixedly coupled to said cam means and connecting said cam means to said arresting arrangements.

2. The damping device, as claimed in claim 1, wherein said cylinder is adapted to be fixedly mounted on the scale apparatus.

3. A damping device for use in connection with the arresting arrangement of a scale apparatus
    comprising in combination
    a hydraulic cylinder having a lower portion and an upper portion, the diameter of said lower portion being different in size from the diameters of said upper portion,
    a piston including a rod operatively arranged in said cylinder,
    cover means for said upper portion of said cylinder operable for tightly sealing said cylinder,
    means adapted for coupling said piston rod with said arresting arrangement,
    said piston being arranged with a clearance in said cylinder for allowing hydraulic fluid to pass around said piston,
    wherein said cylinder is adapted to be movably arranged on said scale apparatus for movement in a direction along the piston thereof,
    said coupling means including first cam and cam follower means actuatable from said arresting arrangement for releasing the piston for movement in said cylinder, and second cam and cam follower means actuatable from said arresting arrangement and including a lever operatively engaging said lower portion of said cylinder for moving said cylinder in a direction opposite to the movement of said piston, said first and second cam and cam follower means being so arranged relative to each other that upon actuation the movement of the cylinder will commence before the movement of the piston.

* * * * *